Patented Nov. 13, 1951

2,575,317

UNITED STATES PATENT OFFICE 2,575,317

PROCESS FOR THE PRODUCTION OF PHOSPHORUS SULFOCHLORIDE

Heinz Jonas and Werner Thraum, Leverkusen, Germany, assignors to Farbenfabriken Bayer, Leverkusen, Germany, a manufacturing and trading organization of Germany No Drawing. Application December 27, 1950, Serial No. 203,003. In Germany February 21, 1949

6 Claims. (Cl. 23—14)

The present invention relates to a process for the production of phosphorus sulfochloride ($PSCl_3$).

It is known to prepare phosphorus sulfochloride from phosphorus trichloride and sulfur by heating it to temperatures exceeding 130° C., preferably 180° C. This process must be carried out in a closed vessel under super-atmospheric pressure. Because of the difficulties involved in this process it has been proposed to carry out the reaction between phosphorus trichloride in the vapor phase and liquid sulfur at temperatures of 150–180° C., and then separate the reaction products by distillation. This reaction, however, proceeds irregularly and slowly and requires voluminous apparatuses. Phosphorus trichloride has also been reacted with sulfur at low temperatures in the presence of alkali or alkali metal sulfides or polysulfides. But also this reaction proceeds very slowly and for this reason cannot be applied technically.

In accordance with the present invention it was found that when using sulfur monochloride ($S_2Cl_2$) as catalyst reaction of phosphorus trichloride with sulfur already proceeds at the boiling temperature of the reaction mixture under atmospheric pressure or below the boiling temperature within a few hours. However, separation of the phosphorus sulfochloride formed from the sulfur chloride by distillation cannot be carried out technically. Separation may be effected, however, chemically. For this purpose elementary phosphorus is added to the boiling reaction mixture, whereupon sulfur monochloride is converted into phosphorus sulfochloride and sulfur according to the following equation:

$$3S_2Cl_2 + 2P \rightarrow 2PSCl_3 + 4S$$

From the said mixture the phosphorus sulfochloride formed can be isolated in a convenient manner by distillation or rectification. It is not necessary that the said separation is performed quantitatively; rather, it is of advantage to leave a larger quantity of phosphorus sulfochloride as solvent and diluent in the residue which is to be used for the process to be carried out next. The sulfur obtained during working up which remains in the residue is to be used for the new reaction with phosphorus trichloride.

In accordance with the present invention it is also possible to proceed according to the known reaction indicated in the above equation of phosphorus sulfochloride from sulfur monochloride and phosphorus technically for producing phosphorus sulfochloride. Carrying out of this known reaction hitherto had the disadvantage that owing to the sulfur formed as a by-product the separation of the mixture is rendered difficult because it is present in a large quantity and impairs the yield of phosphorus sulfochloride. Furthermore, the sulfur obtained is contaminated by phosphorus sulfochloride, rendering its further use difficult. Also the chlorination of sulfur to sulfur monochloride for the new reaction with phosphorus so far was only possible after complete separation of the phosphorus sulfochloride, since also the latter reacts with chlorine, i. e. among other things to form phosphorus trichloride which in this manner would be introduced into the system as contamination. Since, however, in accordance with the present invention phosphorus trichloride reacts with sulfur in the presence of sulfur monochloride at boiling temperatures no harm is caused through its formation during chlorination of the sulfur and phosphorus sulfochloride mixture. All that is required is that the phosphorus trichloride thus formed is heated to boiling together with the sulfur and sulfur monochloride before taking the phosphorus sulfochloride out of the system. This new procedure shows the advantage that phosphorus can be added to the reaction in elementary form only.

The invention is further illustrated by the following examples without being restricted thereto:

*Example 1*

A mixture of 1000 g. of $PSCl_3$, 520 g. of $PCl_3$, 120 g. of sulfur and 405 g. of sulfur monochloride ($S_2Cl_2$) is heated in a flask of 3 liters capacity provided with a stirrer and reflux condenser until the boiling point remains constant.

Then subsequently to the process carried out in the first stage 62 g. of white phosphorus are introduced into the reaction mixture continuously or in small portions while boiling and stirring the mixture. 978 g. of $PSCl_3$ are obtained by distillation.

*Example 2*

A mixture of 1000 g. of $PSCl_3$ and 405 g. of $S_2Cl_2$ is introduced into a flask of three liters capacity provided with a stirrer and reflux condenser. 62 g. of white phosphorus are added continuously or in small portions while stirring and boiling the mixture. After completion of this process 310 g. of $PSCl_3$ are obtained by distillation.

For working up the sulfur obtained according to the above equation about 90% of the stoichiometrically required quantity of chlorine are introduced while boiling the content of the flask. Then boiling is continued until the boiling point remains constant.

We claim:

1. In a process of preparing phosphorus sulfochloride ($PSCl_3$) by reacting phosphorus trichloride with sulfur, the step which comprises heating a mixture of phosphorus trichloride, sulfur and sulfur mono-chloride ($S_2Cl_2$).

2. Process as claimed in claim 1, in which the sulfur mono-chloride is prepared by the reaction of sulfur with chlorine in the presence of phosphorus sulfochloride ($PSCl_3$), said sulfur being prepared by the reaction of sulfur mono-chloride ($S_2Cl_2$) with phosphorus.

3. Process as claimed in claim 1, in which the reaction is performed in the presence of phosphorus sulfochloride ($PSCl_3$), said phosphorus sulfochloride serving as diluent.

4. In a process of preparing phosphorus sulfochloride ($PSCl_3$) by reacting phosphorus trichloride with sulfur, the step which comprises boiling a mixture of phosphorus trichloride, sulfur and sulfur mono-chloride ($S_2Cl_2$).

5. In a process of preparing phosphorus sulfochloride ($PSCl_3$) by reacting phosphorus trichloride with sulfur, the step which comprises heating a mixture of phosphorus trichloride, sulfur and sulfur mono-chloride ($S_2Cl_2$), and after completion of the reaction adding phosphorus and heating again.

6. In a process of preparing phosphorus sulfochloride ($PSCl_3$) by reacting phosphorus trichloride with sulfur, the step which comprises boiling a mixture of phosphorus trichloride, sulfur and sulfur mono-chloride ($S_2Cl_2$), and after completion of the reaction adding phosphorus and boiling again.

HEINZ JONAS.
WERNER THRAUM.

No references cited.